United States Patent [19]

Chalberg

[11] 4,439,876
[45] Apr. 3, 1984

[54] CLAMP ASSEMBLY FOR FLEXIBLE PIPE INSTALLATIONS PRIMARILY FOR THERAPY BATHS

[76] Inventor: Philip E. Chalberg, 119 Maple Ave., Orange, Calif. 92668

[21] Appl. No.: 336,760

[22] Filed: Jan. 4, 1982

[51] Int. Cl.³ .............................................. A61H 33/02
[52] U.S. Cl. ............................................ 4/542; 4/492; 248/74 R
[58] Field of Search ................... 248/63, 68 R, 68 CB, 248/74 A, 74 R; 4/542–544, 492, 524; 138/112

[56] References Cited

U.S. PATENT DOCUMENTS

| 3,095,471 | 6/1963 | Price ................................. 248/68 R |
| 3,856,246 | 12/1974 | Sinko ............................... 248/68 CB |
| 3,946,449 | 3/1976 | Mathis ..................................... 4/542 |
| 4,224,721 | 9/1980 | Ohlson ........................... 248/68 CB X |
| 4,244,542 | 1/1981 | Mathews ......................... 138/112 X |
| 4,306,697 | 12/1981 | Mathews ......................... 248/68 CB |

FOREIGN PATENT DOCUMENTS

| 1290602 | 3/1969 | Fed. Rep. of Germany ... 248/74 A |
| 2248432 | 5/1975 | France .............................. 248/74 A |
| 2439350 | 5/1980 | France .............................. 248/74 A |

Primary Examiner—Charles E. Phillips
Attorney, Agent, or Firm—Fischer, Tachner & Strauss

[57] ABSTRACT

An apparatus for securing flexible interconnecting pipes primarily in a whirlpool bathtub or spa assembly and comprising an improved venturi fitting having a snap-in bracket for receiving an elongated semi-flexible rod around the outer periphery of the tub wall and a plurality of primary pipe support brackets each also having such a snap-in bracket and a pair of C-shaped retainers for receiving the air and water flexible pipes interconnecting the venturi fittings. The rod support brackets may be provided with an optional interconnecting member for receiving an additional C-shaped secondary bracket providing means for supporting additional flexible pipes such as the suction and drain lines of a whirlpool bathtub assembly.

5 Claims, 8 Drawing Figures

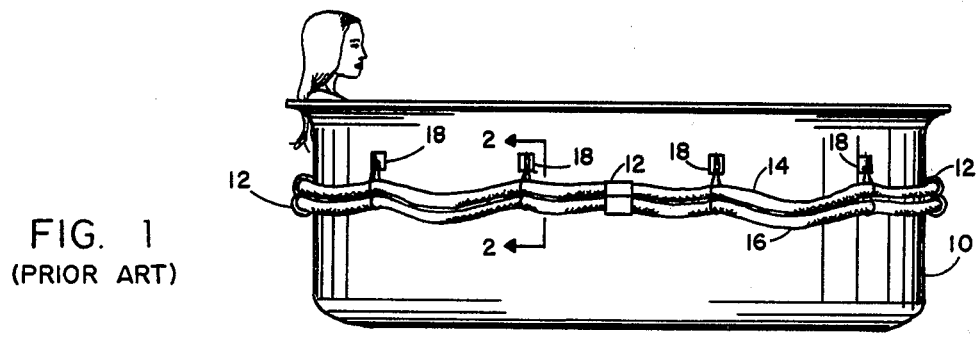
FIG. 1 (PRIOR ART)
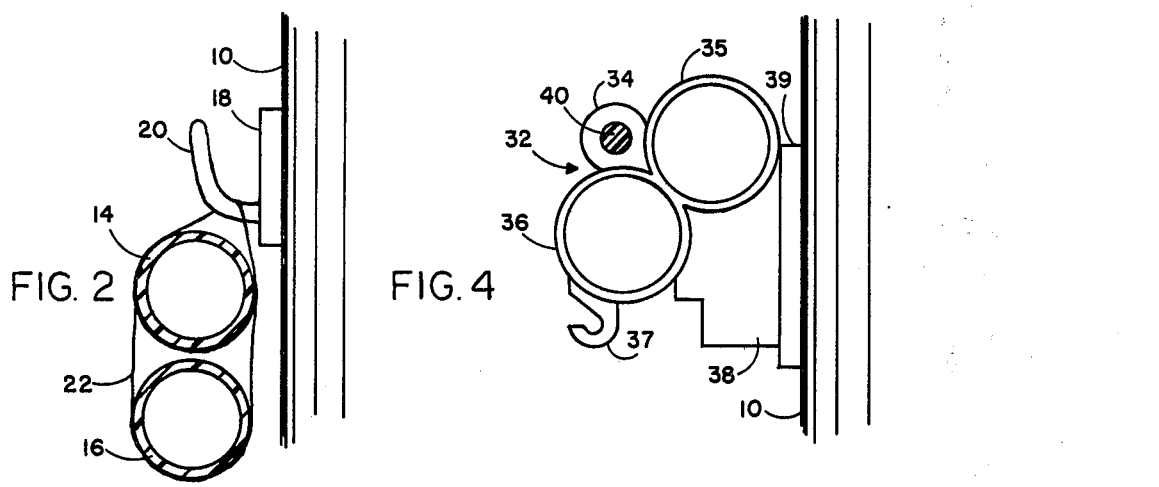

CLAMP ASSEMBLY FOR FLEXIBLE PIPE INSTALLATIONS PRIMARILY FOR THERAPY BATHS

BACKGROUND OF THE INVENTION

1. FIELD OF THE INVENTION

The present invention pertains generally to plumbing fixtures for therapy baths, or spas and more specifically, to a clamp assembly adapted to interface with venturi fitting for therapy or whirlpool baths for supporting flexible pipe interconnecting such fittings and associated plumbing.

2. PRIOR ART

The general concept of utilizing flexible piping for interconnecting fittings and associated plumbing in a hydrabath, therapy bath or spa is well-known in the art. The advantages of utilizing flexible piping for such whirlpool bath installations are also well known. By way of example, flexible piping makes it possible to simplify installation of such bath systems by permitting pre-assembly of the fittings to the bathtub wall surface before the interconnecting pipes are installed, without later incurring the mechanical interface problems that might otherwise arise with rigid pipes. Unfortunately, the flexible pipes have a tendency to flex due to the sheer effect of gravity along their lengths in between connections to fittings. Accordingly, it is common practice when using flexible piping for a whirlpool bath assembly, to first glue or otherwise secure brackets to the outer tub wall surface intermediate of the fittings and then to use tie straps to secure the flexible piping to these brackets in order to support the flexible piping at locations intermediate of the fittings.

Unfortunately, the attempt to prevent the aforementioned sagging even to at least some degree, by such tie wrapping techniques for supporting flexible pipe in whirlpool bathtub assemblies, is highly disadvantageous. The principal disadvantage is the additional time required by the installing personnel to complete the aforementioned tie wrapping process which adds significantly to the time and labor costs involved in installing a whirlpool bathtub assembly. There are other disadvantages, however. For example, if during installation or following installation, the flexible piping is accidentally pulled from its nominal location, there is at least a significant possibility that the physical relationship between the flexible pipe and the tie wraps will change, thereby preventing the flexible piping from springing back into its nominal location after the inadvertent pulling force is released. Furthermore, the process of tie wrapping leaves a great deal of installation discretion to the installers insofar as the number of brackets and tie wraps, and their relative locations with respect to the flexible piping. As a result, it is highly unlikely that there can be a consistent hanging geometry around the entire circumference of each individual whirlpool bathtub. The differences in hanging geometry in separate tub installations are even more pronounced.

SUMMARY OF THE INVENTION

The present invention pertains to a unique apparatus for supporting flexible pipe around the periphery of a whirlpool bathtub or spa including those pipes that deliver air and water to the jet nozzle fittings as well as those pipes which provide the drain and suction lines of the whirlpool bathtub assembly. More specifically, the present invention provides a unique rod and bracket structure which permits the support of flexible piping in a whirlpool bathtub assembly while entirely obviating the need for use of the aforementioned disadvantageous tie wrapping of the prior art. More specifically, the present invention comprises an elongated semi-flexible rod and a plurality of molded brackets that are designed to snap onto the rod and to provide C-shaped pipe securing means for supporting the flexible air and water hoses interconnecting the venturi fittings that are used in the whirlpool bath assembly. Another aspect of the present invention comprises a modification to the venturi fittings to provide a snap clamp as a portion thereof which is designed to receive the aforementioned rod in secure engagement therewith for supporting the rod and the accompanying brackets around the periphery of the tub as will be hereinafter more fully described. Furthermore, the present invention provides an additional set of brackets which are adapted to be secured in snap-in engagement with the aforementioned air and water hose support brackets for supporting flexible suction and drain lines thereto as well, while again obviating any need for the aforementioned disadvantageous tie wrapping of the prior art.

OBJECTS

It is therefore an object of the present invention to provide a novel means for supporting flexible pipe in a whirlpool bath assembly which obviates the disadvantageous use of tie wrapping of the prior art.

It is another object of the present invention to provide a novel rod and bracket assembly for use in whirlpool bath installations for the support of flexible pipes that are used to deliver air and water to the venturi fittings and also for support of the drain line and suction line of such assemblies.

It is still another object of the present invention to provide venturi fittings for whirlpool bathtub assembly which include means for supporting a semi-flexible rod along the entire periphery of the bathtub which is in turn used to support a plurality of snap-on brackets used to support flexible pipe interconnecting such venturi fittings and which brackets include provision for snap-on additional brackets which may be used to support flexible pipes comprising the drain line and suction line of such whirlpool bath assemblies.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the accompanying drawings in which:

FIG. 1 is a plan view of a whirlpool bathtub assembly using flexible interconnecting pipes and prior art means for supporting such pipes around the periphery of the tub;

FIG. 2 is a cross sectional view of the flexible pipes and prior art means for supporting same taken along lines 2—2 of FIG. 1;

FIG. 3 is a plan view of a whirlpool bathtub assembly using flexible interconnecting pipes and the present invention for supporting those pipes around the periphery of the bathtub wall;

FIG. 4 is a cross sectional view taken along lines 4—4 of FIG. 3 and illustrating the improved venturi fitting of the present invention for supporting flexible pipes in such installations;

FIG. 5 is a cross sectional view taken along lines 5—5 of FIG. 3 illustrating the novel flexible pipe support bracket of the present invention;

FIG. 6 is an enlarged plan view of the flexible pipe support bracket of the invention and including a novel interconnecting bracket support rod.

DETAILED DESCRIPTION OF A PREFERRED EMBODIMENT

Figures 7, 8:
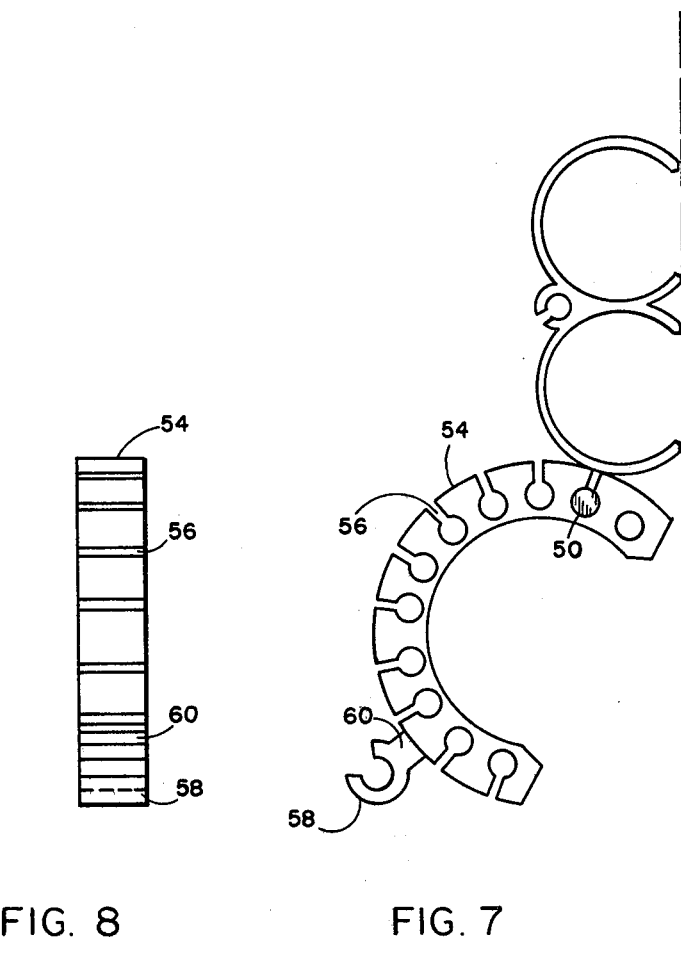
FIGS. 7 and 8 provide side and plan views respectively of an optional feature of the present invention comprising a suction and drain line support bracket which is adapted to be secured to the flexible pipe support bracket.

Referring to FIGS. 1 and 2 there is shown therein a whirlpool bathtub assembly including water and air inerconnections accomplished by means of flexible pipes supported around the exterior periphery of the tub by conventional prior art supporting means. More specifically, as seen in FIG. 1, a typical whirlpool bath assembly comprises a bathtub 10 into which are inserted along the periphery thereof a plurality of venturi fittings 12 each of which includes a water inlet and an air inlet. The inlets are typically interconnected by respective sections of flexible pipe 14 and 16 to form a continuous circuitous path for each of the air and water lines respectively around the periphery of the tub 10. It will be understood that although the use of flexible pipes 14 and 16 is highly advantageous for the aforementioned reasons, such pipes are generally supported at spaced intervals in between venturi fittings 12 in order to preclude unacceptable sagging due to the sheer effects of gravity along the extended pipe lengths between the fittings. As shown further in FIGS. 1 and 2 the prior art flexible pipe supporting means comprises a plurality of hook brackets 18 typically glued or otherwise secured to the outer surface of the bathtub wall at spaced intervals between the fittings 12. Each such hook bracket typically comprises a protrusion 20 which provides means for securing a tie wrap 22 around the periphery of flexible pipes 14 and 16 for positioning such pipes in relative proximity to the hook bracket 18. It will be understood by those having skill in the art to which the present invention pertains, that the location of each hook bracket 18 on the tub wall surface may vary considerably during any single installation. Furthermore, it will also be clear that the length of tie wrap 22 may also vary considerably. Furthermore, the actual distance between flexible pipes 14 and 16 and each bracket 18 depends also on the nimbleness of the installer in preparing the ties. As a consequence thereof the position of flexible pipes 14 and 16 intermittent of fittings 12 around the periphery of tub 10 may vary considerably and in addition, there may be a considerable degree of sagging of the flexible pipes particularly at the positions midway between the fittings 12 as seen in FIG. 1.

The present invention solves the aforementioned disadvantages of the prior art by providing a unique bracketing concept for flexible piping. More specifically, the present invention comprises a flexible pipe support assembly 30 having a plurality of improved venturi fittings 32 providing support for one or more semi-flexible elongated rods 40 which may be readily shaped to the periphery of the bathtub exterior as seen in FIG. 3. Also shown in FIG. 3 is a plurality of flexible pipe support brackets 42 which also form part of the present invention and which are designed to provide support for the flexible pipes 14 and 16 without any need for gluing or tie wraps as disclosed previously in conjunction with prior art FIGS. 1 and 2. As seen in FIG. 4 each improved venturi fitting of the present invention provides a novel and integral rod securing or retainer bracket 34 mounted substantially symmetrically of air inlet interface pipe 35 and a water inlet interface pipe 36. Those having skill in the art to which the present invention pertains will understand that the air and water inlets 35 and 36 respectively provide means for feeding air and water respectively into a common mixing chamber 38 which terminates in a flange 39 which is in fixed compressive engagement with the outside surface of tub 10. As also shown in FIG. 4 the improved venturi fitting of the present invention may optionally include an additional hook-like bracket 37 which may be provided to enable additional attachments to the venturi fittings of the invention at the option of the user. However it is to be understood that hook-like bracket 37 is entirely optional and is not to be deemed limitative of the present invention. Typically, rod or rods 40 may be made of either flexible plastic or metal and as seen in FIG. 3, should be capable of being bent with relatively large radius in order to conform to the peripheral shape of the tub and to be secured to at least one rod retainer bracket 34 of the respective venturi fittings 32 around the periphery of the tub 10. It will be understood further that although a particular number and spacing of brackets 42 is illustrated in FIG. 3, the actual number of such rods, brackets and their relative spacing may be varied depending upon the number of venturi fittings installed in a whirlpool bath assembly using the present invention and also depending upon the overall dimensions of the bathtub to which the present invention is connected. For example, one rod 40 may be used for each fitting 12 and one pair of adjacent brackets 42. Accordingly, the configuration illustrated in FIG. 3 is merely suggestive and is also not deemed to be limitative of the present invention.

A more detailed illustration of the flexible pipe support brackets 42 is provided in FIGS. 5 and 6 wherein it is seen that each bracket 42 comprises a pair of integral C-shaped support members 44 and 46 adapted to receive flexible pipes 14 and 16 respectively. Each bracket 42 also includes a snap-in rod support member 48 adapted to receive rod 40 as illustrated in FIG. 6. Because the venturi fittings 12 and rod support bracket 42 are preferably made of a semi-flexible plastic such as polyvinyl chloride (PVC), rod 40 is readily snapped into support members 34 of venturi fittings 12 and support members 48 of support bracket 42. Similarly, C-shaped members 44 and 46 are also adapted to receive flexible pipes 14 and 16 in simple snap-in engagement during installation. As such it will now be seen that when installing a whirlpool bath assembly incorporating the present invention after the venturi fittings 32 have been secured in place in a well-known manner, rod 40 is shaped to conform to the peripheral configuration of tub 10 and snapped into venturi fittings 32 by means of support members 34. Then rod support bracket 42 are each snapped into place on rod 40 and then positioned to receive flexible pipes 14 and 16 as they are installed around the periphery of the tub 10 interconnecting the respective venturi fittings 32.

The present invention optionally provides snap-in support capability for additional flexible pipes such as the suction and drain lines typically used in a whirlpool bath assembly installation. For this purpose, brackets 42 may also be provided with a cylindrical interconnecting member 50 which is affixed by means of a leg 52 to the lowermost portion of flexible pipe bracket 46 as seen best in FIGS. 5 and 6. Interface members 50 are adapted to receive an additional bracket which, for example, may be used to support both the suction and drain lines of a typical whirlpool bath assembly. Such an optional additional bracket is illustrated in FIGS. 7 and 8 in which it is shown, that an additional bracket adapted to support a typical flexible suction line and drain line which are typically 1¾ inches and ⅜ inches outer diameters respectively, comprises a C-shaped bracket member 54 including a plurality of slotted circular apertures 56 each one of which is designed to slide over and securely engage interface member 50 and leg 52 of rod support brackets 42. Also shown in FIGS. 7 and 8 each C-shaped bracket member 54 comprises an additional snap-in type support member 58 extending from the lower portion of brackets 54 by means of an interface link 60. It will be understood that the C-shaped members 54 are adapted to receive the larger flexible suction line hoses and that each of the snap-in type support members 58 is adapted to receive the flexible drain line. It will also be understood that because of the preferably semi-flexible material such as PVC of which the members 54 and 58 are formed, the suction and drain lines are also readily snapped into supporting engagement therewith in the same manner as discussed previously with respect to flexible pipes 14 and 16, venturi fittings 12 and rod support brackets 42.

It will now be understood that what has been disclosed herein comprises a unique and novel means for supporting flexible pipes in a whirlpool bath assembly and which obviates the disadvantageous use of bracket gluing and tie wrapping of the prior art. The invention comprises a novel rod and bracket assembly for use in whirlpool bath installations for the support of flexible pipes that are used to deliver air and water to the venturi fittings and also provides means for optionally supporting the drain lines and suction lines of such assemblies. In the present invention the venturi fittings include means for supporting a semi-flexible rod along the entire periphery of the bathtub. The rod is in turn used to support a plurality of snap-on brackets used to clamp flexible pipe, interconnecting such venturi fittings. Optional additional snap-on brackets may be used to support flexible pipes comprising the drain line and suction line of such whirlpool bathtub assemblies.

It will also be understood that as a result of applicant's teaching herein disclosed, those having skill in the art to which the present invention pertains will now be able to make additions and modifications to the present invention. For example, it will be obvious to now utilize different materials, different dimensions, different structural configurations and to provide means for attaching additional brackets for supporting additional flexible lines in whirlpool bath assemblies to which no reference has been made herein. However all such additions and modifications are comtemplated to be within the scope of the present invention which is to be limited only by the claims appended hereto.

I claim:

1. An improved whirlpool jet assembly, the assembly of the type having a plurality of Venturi jets, each such jet having a flange for compressive engagement with the outside surface of a tub wall coaxially with an aperture through the tub wall, a Venturi mixing chamber terminating in the flange and configured for generating an aerated jet of water into the tub, and parallel water and air inlets communicating with the mixing chamber for providing the water and air; the improvement comprising:

a plurality of retainer brackets, one such bracket integrally affixed to each of said jets, each of said brackets having a C-shaped member for receiving an elongated rod, at least one elongated rod shaped to substantially conform to the outer peripheral surface of said tub wall along at least a portion thereof, and a plurality of primary pipe support brackets each having an outwardly facing C-shaped member for attachment to said rod and a pair of inwardly facing C-shaped members for receiving a pair of parallel flexible pipes, one such pipe for interconnecting the air inlets of respective jets and the other such pipe for interconnecting the water inlets of respective jets, at least one such primary support bracket being located between each two of said jets whereby to support said flexible pipes around the periphery of said tub wall intermediate of said jets and adjacent said tub wall.

2. The apparatus recited in claim 1 further comprising means on each said primary pipe support bracket for attachment to at least one additional pipe support bracket, and a plurality of secondary pipe support brackets each having means for attachment to one of said primary pipe support brackets and also having at least one C-shaped member for receiving a flexible pipe.

3. The apparatus recited in claim 2 wherein each said secondary pipe support bracket comprises a pair of integral C-shaped members for receiving an additional pair of flexible pipes.

4. The apparatus recited in claim 3 wherein said additional pair of flexible pipes comprises the suction line pipe and drain line pipe of said whirlpool jet assembly.

5. The apparatus recited in claim 1 wherein each said retainer bracket and each said venturi jet are formed of a unitary molded plastic fitting.

* * * * *